US006862367B1

(12) United States Patent
Granlund (10) Patent No.: US 6,862,367 B1
(45) Date of Patent: Mar. 1, 2005

(54) ARTIFICIAL VISION METHOD AND SYSTEM

(76) Inventor: Gosta Granlund, Valhallagatan 16, SE-582 Linköping (SE)

( * ) Notice: Subject to any disclaimer, the term of this patent is extended or adjusted under 35 U.S.C. 154(b) by 0 days.

(21) Appl. No.: 09/937,382

(22) PCT Filed: Jun. 10, 1999

(86) PCT No.: PCT/SE99/00894

§ 371 (c)(1),
(2), (4) Date: Sep. 25, 2001

(87) PCT Pub. No.: WO00/58914

PCT Pub. Date: Oct. 5, 2000

(30) Foreign Application Priority Data

Mar. 26, 1999 (SE) .............................................. 9901110

(51) Int. Cl.[7] .............................. G06K 9/46; G06K 9/28
(52) U.S. Cl. ....................... 382/195; 382/205; 382/323; 382/324
(58) Field of Search ................................ 382/190, 195, 382/201, 181, 323, 324, 205, 100

(56) References Cited

U.S. PATENT DOCUMENTS

| 4,282,510 A | * | 8/1981 | Southgate | .................... 382/279 |
|---|---|---|---|---|
| 5,569,907 A | * | 10/1996 | Meunier | ................... 250/208.1 |
| 5,726,443 A | * | 3/1998 | Immega et al. | ........... 250/227.2 |
| 5,901,244 A | * | 5/1999 | Souma et al. | ................ 382/190 |
| 5,963,667 A | * | 10/1999 | Hashimoto et al. | ......... 382/190 |
| 6,269,354 B1 | * | 7/2001 | Arathorn | ...................... 706/27 |
| 6,751,354 B2 | * | 6/2004 | Foote et al. | ................ 382/224 |

OTHER PUBLICATIONS

Gaardner. "The Design of Point Detector Arrays, I." IEEE Trans. on Information Theory, vol. IT-13, No. 1, Jan. 1967, pp. 42-50.*

Hori et al. "A Simultaneous High-Speed Measuring System of Multiple Points." Conf. Proc. Instrumentation and Measurement Technology Conference, vol. 3, May 10, 1994, pp. 1365-1368.*

* cited by examiner

Primary Examiner—Jon Chang
(74) Attorney, Agent, or Firm—Young & Thompson (57) ABSTRACT

An artificial vision system includes means (12, 14) for generating an image percept vector, means (16) for transforming this image percept vector into a feature vector, and means (16) for generating a response vector by multiplying the feature vector by a corresponding trained linkage matrix modeling a percept-response system.

19 Claims, 11 Drawing Sheets

ARTIFICIAL VISION METHOD AND SYSTEM

TECHNICAL FIELD

The present invention relates to an artificial vision method and system. The invention may, for example, be used for control in robotics systems.

BACKGROUND

Traditionally artificial vision systems have been either discrete or continuous.

Discrete systems are characterized by a large number of logical states (0 or 1), normally implemented by a computer, which gives a rich structure. This allows for switching of the system between many different states implementing different models. However, a continuous transition between models is often difficult with such a structure, since the discrete switching structure can not easily transfer knowledge about system states and boundary conditions.

A continuous system implements classical control strategies. This generally allows only a fairly limited complexity, with a limited number of variables, since the systems otherwise become very unwieldy.

SUMMARY

An object of the present invention is an artificial vision method and system that has a rich structure and allows continuous transitions between different models.

This object is solved in accordance with the appended claims.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 7:
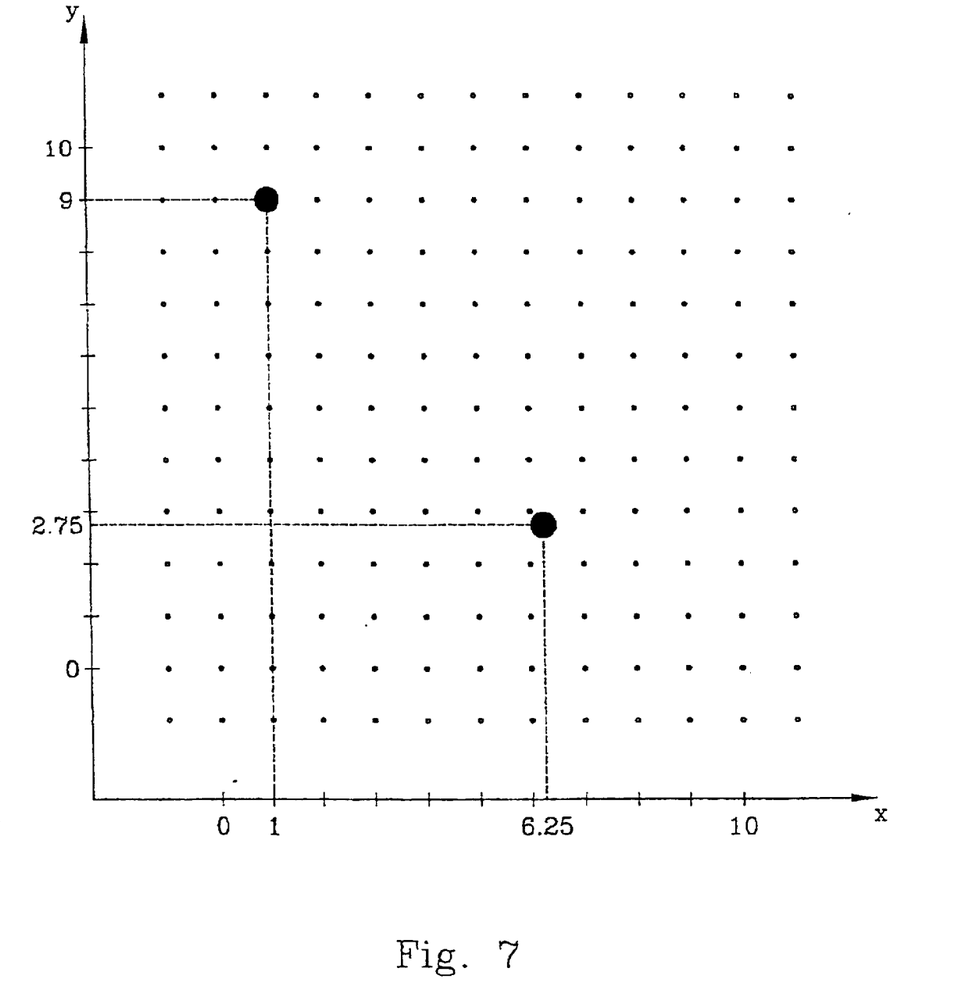
FIG. 7 is a two-dimensional image containing two dots.
Figure 8:
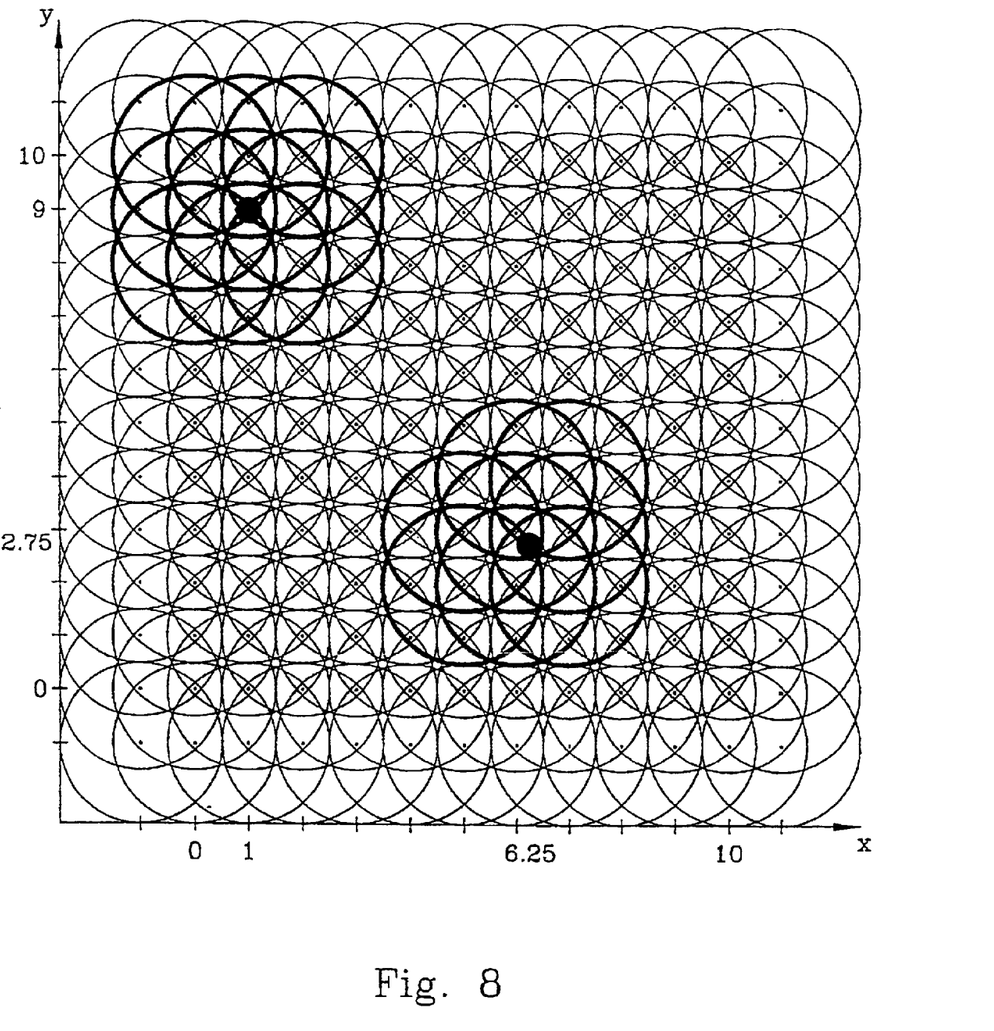
FIG. 8 is a diagram illustrating a detector arrangement for generation of an image percept vector from the image in FIG. 7.
Figure 9:
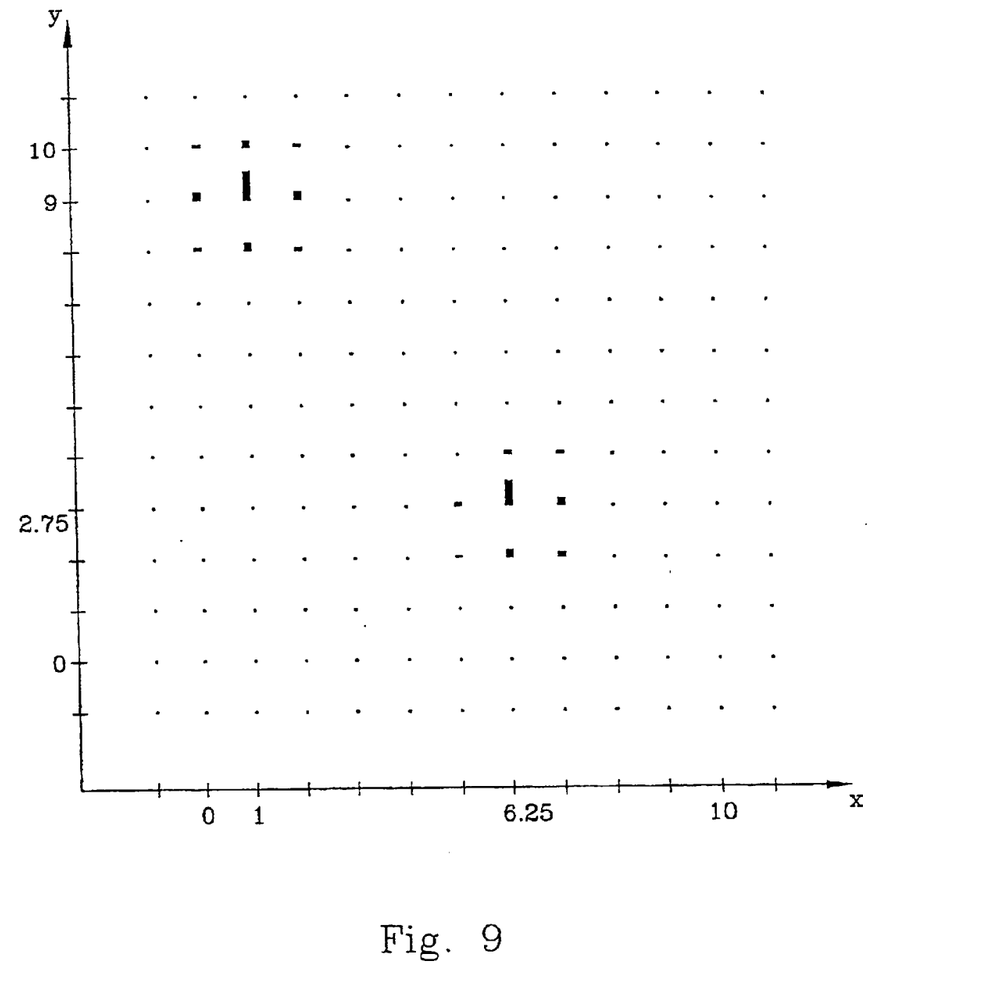
FIG. 9 is a diagram illustrating the image percept vector generated by the detector arrangement in FIG. 8.

An essential feature of the present invention is an image percept vector. This concept will now be described with reference to FIGS. 1-9. First the concept will be described in one dimension (FIGS. 1-6). Then the concept will be generalized to two or more dimensions (FIGS. 7-9).

Figure 1:
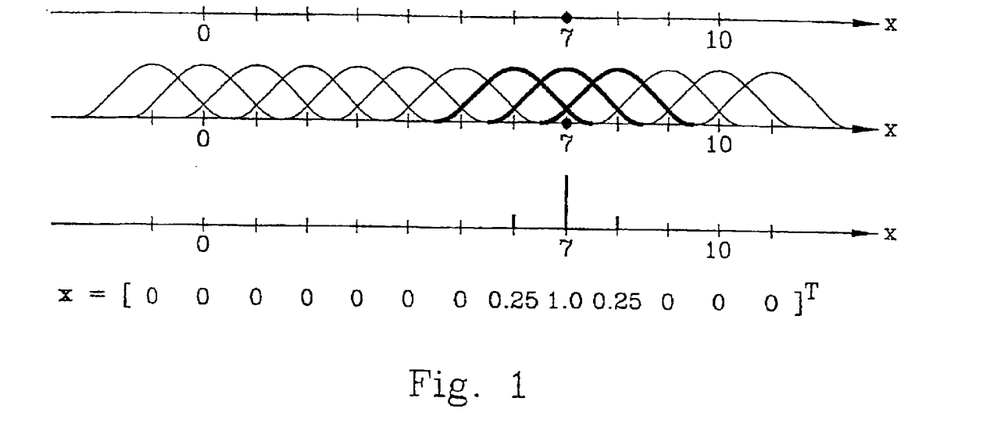
FIG. 1 is a set of diagrams illustrating generation of an image percept vector of a one-dimensional image containing a dot.

FIG. 1 is a set of diagrams illustrating generation of an image percept vector of a one-dimensional image containing a dot. The upper part of FIG. 1 includes an image along a line segment from x=0 to x=10 with a single dot at x=7. Thus this image could simply be represented as "x=7", the location of the dot.

Another way of representing the image, called channel representation, is suggested by the manner in which the dot may actually be detected. To detect the dot some kind of detector is used. In order to give any information on the location of the dot, such a detector can not cover the entire image. If this were the case, the detector would only indicate that there is a dot in the image, but not where it is located. Thus, it is natural to use an array of detectors, each covering only a part of the one-dimensional image. Such an array is illustrated by the curves in FIG. 1. Each curve represents the transfer function of a local dot detector. In FIG. 1 a typical dot detector has the transfer function:

$$p_k(x) = \begin{cases} \cos^2(\frac{\pi}{3}(x-k)) & \text{if } k - \frac{3}{2} \le x \le k + \frac{3}{2} \\ 0 & \text{otherwise} \end{cases}$$

With this choice the detectors will have their most sensitive center portions at integer coordinate values x=k. This is of course not necessary. With other choices of scaling factors and offsets in the argument of the raised cosine function, the density and overlap of these detectors may be varied. Furthermore, other choices of transfer functions, such as gaussian transfer functions are also possible.

An essential and required feature of a detector arrangement is that the application of a stimulus activates more than one channel. For a description of point objects, this requires that the transfer functions of the detectors partially overlap. This implies that the single dot at x=7 in FIG. 1 will activate several detectors. In FIG. 1 the activated detectors have been indicated by thicker solid curves. Only the detectors that have non-zero transfer functions at the location of the dot will be activated and produce a non-zero output signal. This has been indicated by the bar diagram under the array of transfer functions in FIG. 1. For a dot at x=7, the detectors at x=6, 7, 8 will be the only activated detectors. The detector at x=7 will give an output signal $p_7=1$, while the other two detectors will give $p_6=p_8=0.25$. As indicated at the bottom of FIG. 1, the image (the dot) may be represented as the image percept vector:

$$x=[0\ 0\ 0\ 0\ 0\ 0\ 0\ 0.25\ 1.0\ 0.25\ 0\ 00]^T$$

where "$T$" denotes transpose. Typically most of the outputs or vector elements will be zero, i.e. the vector is sparse. While the output of a single channel (detector) would not uniquely define a corresponding scalar value x, the set of outputs from partially overlapping channels will (a method for converting a vector to a scalar will be described below). The reason for the extra two detectors (at x=−1 and x=11) at the ends of the image is the required overlap of the transfer functions.

Figure 2:
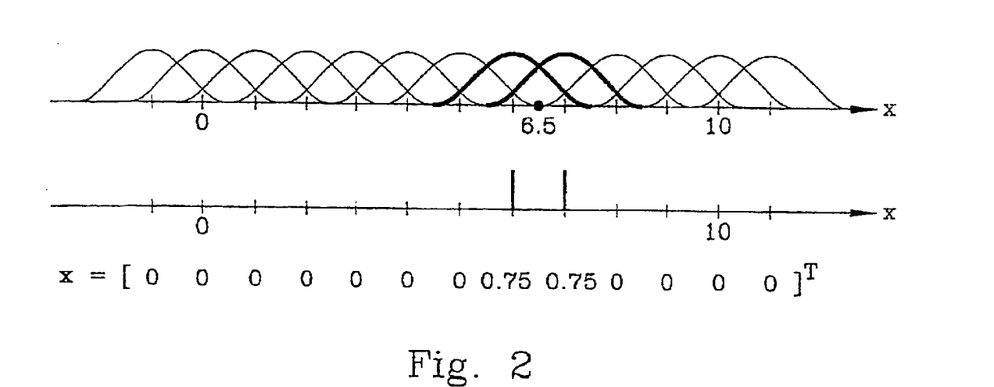
FIG. 2 is a set of diagrams illustrating generation of an image percept vector of a one-dimensional image containing another dot.

FIG. 2 is a set of diagrams illustrating generation of an image percept vector of a one-dimensional image containing another dot. This figure illustrates that the number of activated detectors will depend on the location of the dot. In this case the dot is located at x=6.5. Therefore only the detectors at x=6 and x=7 will be activated. However, at least two detectors will always be activated (due to the overlap) irrespective of the location of the dot in the image.

Figure 3:
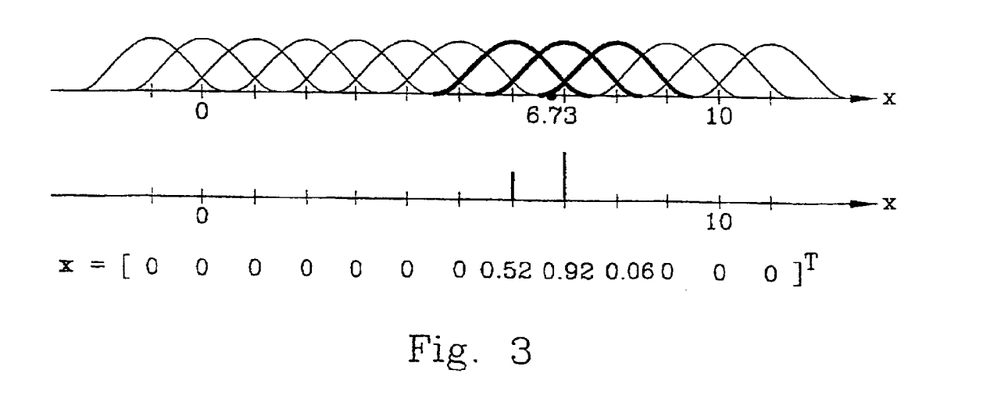
FIG. 3 is a set of diagrams illustrating generation of an image percept vector of a one-dimensional image containing still another dot.

FIG. 3 is a set of diagrams illustrating generation of an image percept vector of a one-dimensional image containing still another dot. This figure illustrates that the dot may have an arbitrary location (x=6.73 in the example) in the image and still be detected and represented by an image percept vector x.

Figure 4:
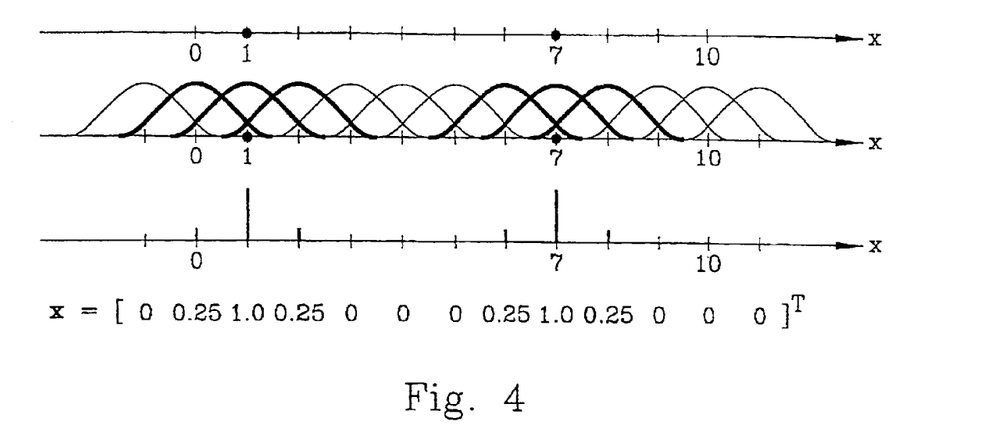
FIG. 4 is a set of diagrams illustrating generation of an image percept vector of a one-dimensional image containing two dots.

FIG. 4 is a set of diagrams illustrating generation of an image percept vector of a one-dimensional image containing two dots. In this case the image percept vector x will include two detector sections with non-zero outputs corresponding to the two dots. Note that the number of dimensions of the percept vector is still the same as in FIGS. 1-3, although the image now contains two dots.

Figure 5:
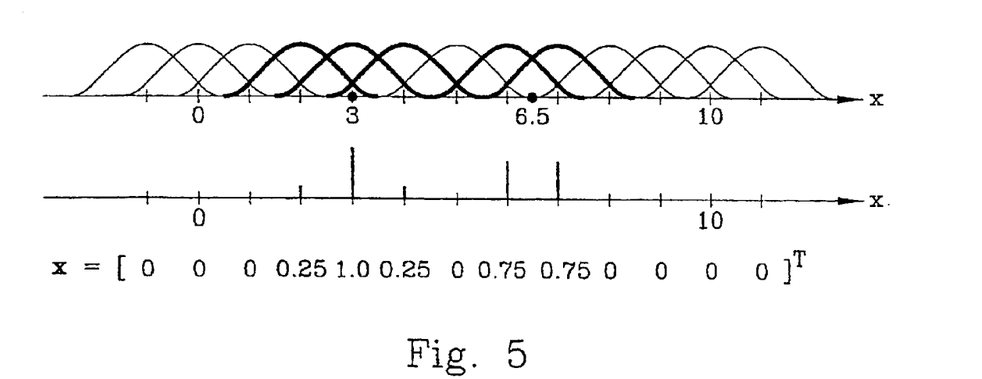
FIG. 5 is a set of diagrams illustrating generation of an image percept vector of a one-dimensional image containing two different dots.

FIG. 5 is a set of diagrams illustrating generation of an image percept vector of a one-dimensional image containing two different dots. In this case the dots are closer to each other, but they can still be identified as two separate dots.

Figure 6:
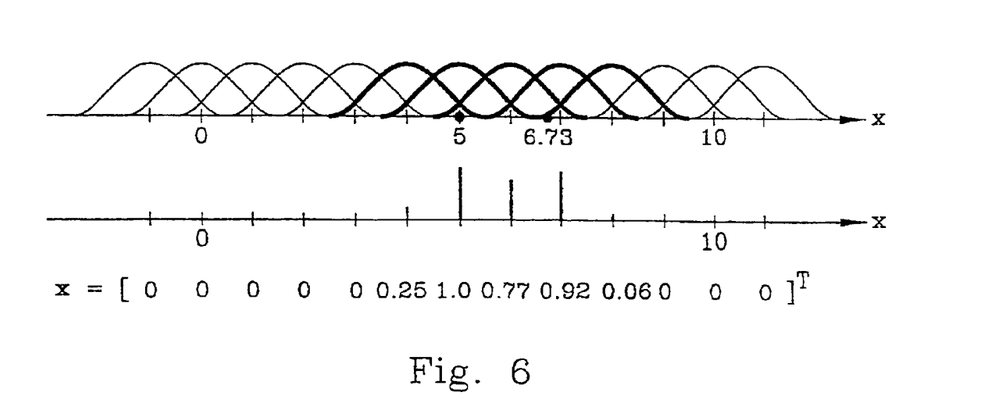
FIG. 6 is a set of diagrams illustrating generation of an image percept vector of a one-dimensional image containing two closely spaced dots.

FIG. 6 is a set of diagrams illustrating generation of an image percept vector of a one-dimensional image containing two closely spaced dots. In this case the detector at x=6 is activated by both dots, and it starts to become difficult to separate the dots. This illustrates the fact that the detector density must be determined by the desired resolution on the image.

Having described the concepts of channel representation and image percept vectors for the one-dimensional case, it is now time to generalize these concepts to more realistic two-dimensional images.

FIG. 7 is a two-dimensional image containing two dots. One is located at x=1, y=9 and the other at x=6.25, y=2.75. As will be illustrated below, this two-dimensional image may also be represented by an image percept vector.

FIG. 8 is a diagram illustrating a detector arrangement for generation of an image percept vector from the image in FIG. 7. In this case there are two-dimensional detectors having typical transfer functions:

$$p_{kl}(x,y) = \cos^2\left(\frac{\pi}{3}\sqrt{(x-k)^2+(y-l)^2}\right),$$

$$k-\frac{3}{2} \leq x \leq k+\frac{3}{2},\ \ l-\frac{3}{2} \leq y \leq l+\frac{3}{2}$$

where k and l are the integer center points of the detectors. In FIG. 8 the coverage area of each detector in the two-dimensional arrangement has been indicated by a circle. As in the one-dimensional case, a dot will activate only nearby detectors. The detectors activated by the dots at (1, 9) and (6.25, 2.75) have been indicated by thick solid circles.

FIG. 9 is a bar diagram illustrating the image percept vector generated by the detector arrangement in FIG. 8. In FIG. 9 the bars are distributed in a two-dimensional array similar to the coordinate grid in FIG. 8. However, this array may be rearranged into a column vector, as in the one-dimensional case, by starting with column 1 in the array, concatenating column 2 to the end of column 1, concatenating column 3 to the end of column 2, etc. Another way of rearranging the array into a vector is to concatenate the rows of the array instead and then transpose the obtained row vector into a column vector. In fact, how the array is rearranged into a vector is irrelevant, for the purposes of the present invention, as long as all detector outputs are included in the resulting image percept vector x and they maintain the same position throughout all steps. The image percept vector components may simply be viewed as a collection of unordered channels (channel representation). In a typical system the image percept vector x has between $10^2$ to $10^4$ components.

The concept of percept vector may also be generalized to three-dimensional or four-dimensional (the fourth dimension representing time) images. The percept vector of such an image may still be formed by forming a column vector from the detector output signals.

The above described image percept vector x forms the basis for a feature vector a, which is to be associated with a response state of the system. The feature vector a may include one or more of three different functions of the image percept vector, namely:

1. Linear components, which are formed by the image percept vector $$x = \begin{pmatrix} x_1 \\ x_2 \\ \vdots \\ x_J \end{pmatrix}$$

itself or selected components thereof.

2. Autocovariance products, which are formed by diagonal elements of the covariance product matrix $$xx^T = \begin{pmatrix} x_1 x_1 & x_1 x_2 & \cdots & x_1 x_J \\ x_2 x_1 & x_2 x_2 & \cdots & x_2 x_J \\ \vdots & \vdots & \vdots & \vdots \\ x_J x_1 & x_J x_2 & \cdots & x_J x_J \end{pmatrix}$$

and are denoted $xx^T_{auto}$.

3. Covariance products, which are formed by off-diagonal elements of the covariance product matrix $xx^T$, and are denoted $xx^T_{cov}$. Experiments indicate that the covariance products are the most descriptive feature vector components, since they describe coincidences between events, but the other components should be kept in mind for various special purposes, such as improved redundancy, low feature density, etc.

Thus, a feature vector may have the form:

$$a = \begin{pmatrix} x \\ xx_{auto}^T \\ xx_{cov}^T \end{pmatrix} = \begin{pmatrix} a_1 \\ a_2 \\ \vdots \\ a_H \end{pmatrix}$$

In certain cases it may be desirable to employ a logarithmic representation of the feature vector a. Furthermore, if increased complexity is acceptable, it is also possible to include multi-covariant products (products of three or more percept vector components) in the feature vector.

In accordance with the present invention the feature vector a is used to generate a response vector u in accordance with the equation:

$$u = \begin{pmatrix} u_1 \\ u_2 \\ \vdots \\ u_K \end{pmatrix} = \begin{pmatrix} c_{11} & c_{12} & \cdots & c_{1H} \\ c_{21} & c_{22} & \cdots & c_{2H} \\ \vdots & \vdots & \vdots & \vdots \\ c_{K1} & c_{K2} & \cdots & c_{KH} \end{pmatrix} \begin{pmatrix} a_1 \\ a_2 \\ \vdots \\ a_H \end{pmatrix} = Ca$$

where C is denoted a linkage matrix, which will be described in further detail below. The response vector u may typically represent a characteristic of an object of interest, for example the horizontal or the vertical location of the center of a circle in an image, the diameter of a circle, the length of a straight line segment, the orientation of a line segment, etc. Note that the dimensionality H of the feature vector a may be (and typically is) different from the dimensionality K of the response vector u. Thus, in general the linkage matrix C is non-square.

The purpose of the linkage matrix C is to transform the generally continuous but spread out feature vector a into a likewise continuous but concentrated response vector u. To illustrate this statement, consider a circle of a certain diameter. This circle will result in a certain percept vector x and a corresponding feature vector a. The feature vector a will typically have bursts of non-zero elements separated by regions of zero elements. The linkage matrix C acts as a "concentrator" that transforms the feature vector a into a response vector u having a single burst of non-zero elements. If the diameter of the circle is changed slightly, the corresponding feature vector a will be different, since the bursts will be redistributed, while the response vector u will only shift its single burst slightly. What is essential here is the local continuity between variation of the output of a particular active channel and the variation of the property and/or the position of the object having the property sensed by the channel. Continuous change of a response variable locally will correspond to local, continuous changes within a group of feature channels. A particular combination of active feature channels and their values will correspond to a particular, unique response state (response vector). The major characteristic of this system is that it is locally continuous at the same time as it allows global discontinuity. The system is continuous and linear in its local mapping of the feature vector over the linkage matrix. On the other hand, it is highly non-linear and discontinuous in its global mapping, in the sense that features come and go, and there is no requirement that feature channels are adjacent in some space. As noted above, there is no requirement that the channels are located next to each other in the percept vector, as "they will find each other" with a properly optimized linkage matrix (this procedure is described below). Thus, the illustrations presented in this specification, with active channels next to each other, is only for visualization purposes, to make the description more comprehensible. In fact, the channels may be arranged at random, as long as the arrangement is fixed over the entire process and every channel reacts continuously to stimuli.

Once the response vector has been obtained in channel representation form, it may be desirable, especially for technical systems, to obtain a scalar value representing the response. This scalar value may, for example, be used to specify the location of an object, to drive a motor or to visualize system states on a screen.

The output from a single channel $u_k$ of a response vector u, will not provide an unambiguous representation of the corresponding scalar signal u, as there will be an ambiguity in terms of the position of u with respect to the center of the activated channel. This ambiguity may, however, be resolved by the combination of adjacent channel responses within the response vector $u=\{u_k\}$.

By using a sufficiently dense representation in terms of channels, it is possible to employ the knowledge of a particular distance between different channel contributions (detectors). An example of a suitable algorithm will now be given.

If the distance in phase between adjacent raised cosine detectors is $\pi/3$ or less, an approximate reconstruction of u from the response vector u is possible.

As noted above, the response vector u will have a burst with only a few non-zero values. A first approximation of u may be obtained by the average:

$$\bar{l} = \frac{\sum_{k=1}^{K} k \cdot u_k}{\sum_{k=1}^{K} u_k}$$

This average is a coarse measure of the location of the burst. A refined estimate $\hat{u}$ of u may be obtained in accordance with:

$$\begin{cases} \hat{u} = l + \delta \\ l = \text{floor}(\bar{l}) \end{cases}$$

where floor is a function that sets its argument to the nearest integer that is less than or equal to the argument, and $\delta$ is a correction defied by:

$$\delta = 2 \cdot atan2(x,y)/\pi$$

where atan2 is the four quadrant inverse tangent function defined in the interval $[-\pi, \pi]$ (as defined in MATLAB®, for example), and x, y are defined by:

$$\begin{cases} x = u_I - u_{I+2} & u_j = 0 \text{ if } j > K \\ y = u_{I+1} - u_{I-1} & u_j = 0 \text{ if } j < 1 \end{cases}$$

From the above description it is clear that it is the relation between two or more channels that allows a continuous mapping between a channel representation and a conventional scalar representation.

The linkage matrix C is determined by a training procedure, which will now be described with reference to FIG. 10.

Figure 10:
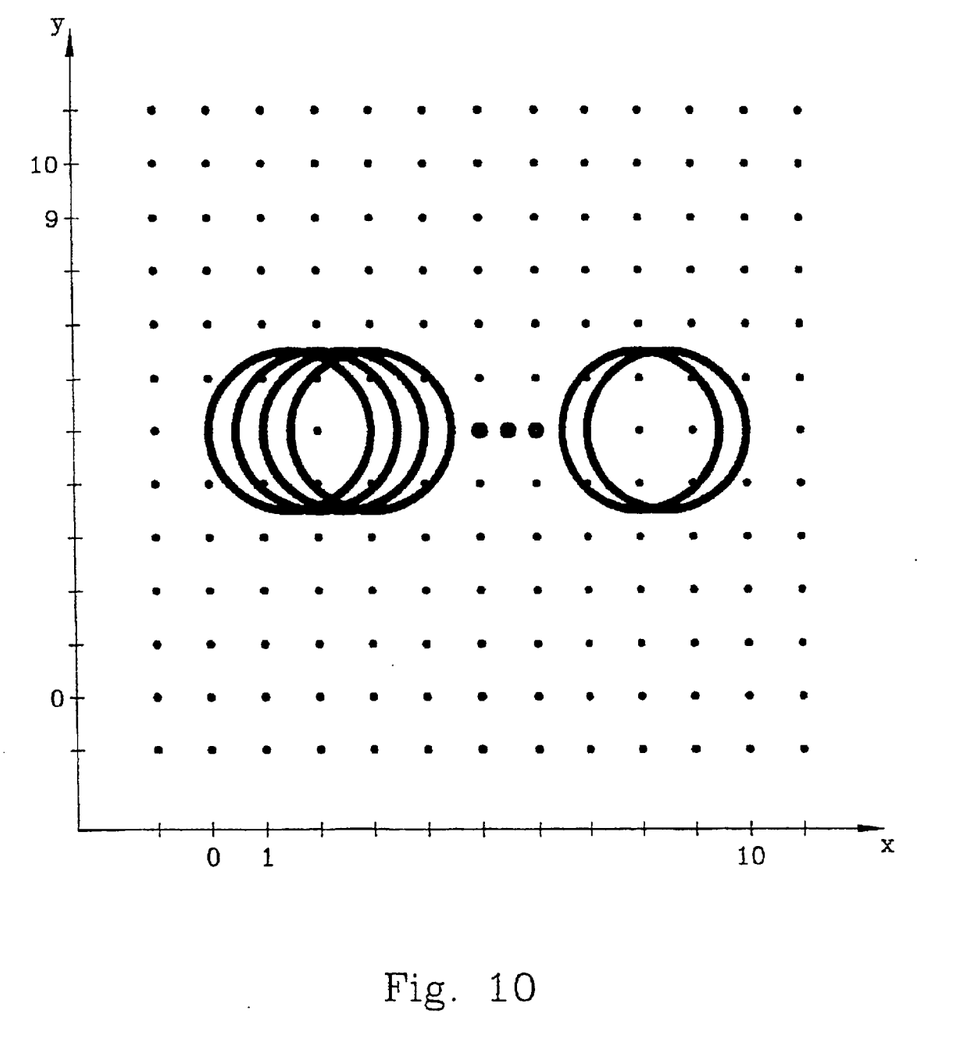
FIG. 10 is a diagram of a circle that is shifted along a horizontal line for training purposes.

FIG. 10 is a diagram of a circle that is shifted along a horizontal line. Each position of the circle results in a different pair of feature vector $a^i$ and response vector $u^i$. However, each pair should be linked by the same linkage matrix C. This leads to the following set of equations:

$$U = \begin{pmatrix} u_1^1 & u_1^2 & \cdots & u_1^N \\ u_2^1 & u_2^2 & \cdots & u_2^N \\ \vdots & \vdots & \vdots & \vdots \\ u_K^1 & u_K^2 & \cdots & u_K^N \end{pmatrix} = \begin{pmatrix} c_{11} & c_{12} & \cdots & c_{1H} \\ c_{21} & c_{22} & \cdots & c_{2H} \\ \vdots & \vdots & \vdots & \vdots \\ c_{K1} & c_{K2} & \cdots & c_{KH} \end{pmatrix} \begin{pmatrix} a_1^1 & a_1^2 & \cdots & a_1^N \\ a_2^1 & a_2^2 & \cdots & a_2^N \\ \vdots & \vdots & \vdots & \vdots \\ a_H^1 & a_H^2 & \cdots & a_H^N \end{pmatrix} = CA$$

where N denotes the number of shift positions or the length of the training sequence and A is denoted a feature matrix. These equations may be solved by conventional approximate methods (typically methods that minimize mean squared errors) to determine the linkage matrix C (see [1]). With respect to this minimization the continuity in each channel is crucial, because this is what makes it possible to perform an optimization. Once the linkage matrix C has been determined, an arbitrary circle position along the horizontal line may be detected from its feature vector a to produce the corresponding response vector u.

Figure 11:
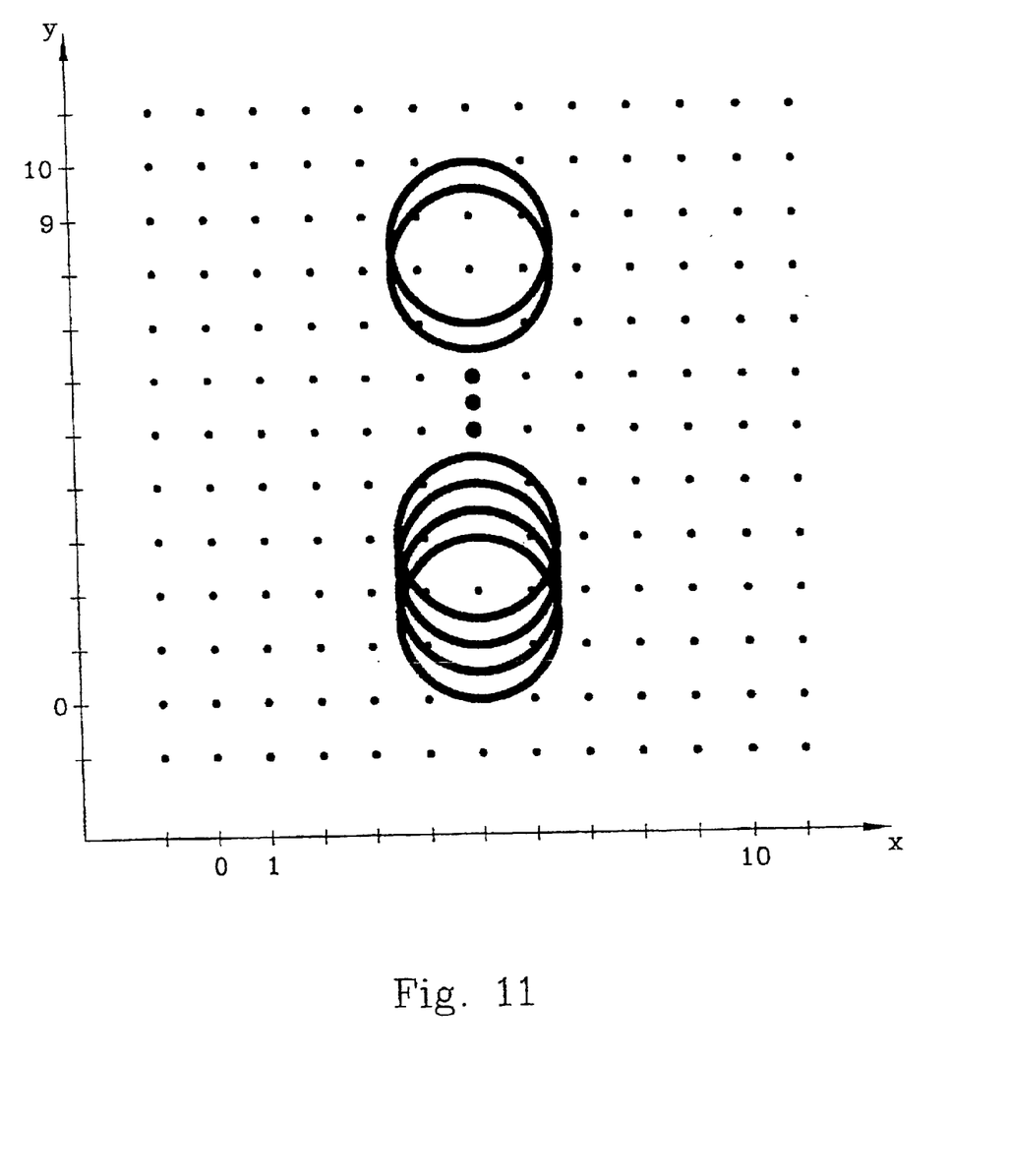
FIG. 11 is a diagram of a circle that is shifted along a vertical line for training purposes.

FIG. 11 is a diagram of a circle that is shifted along a vertical line. These shifted circles may in a similar way be used to find a linkage matrix $C^v$ linking a feature vector a to a response vector v representing vertical position along a vertical line. Note that the linkage matrix $C^v$ corresponding to vertical position is in general different from the previous linkage matrix C (or rather $C^u$ since it is associated with u) corresponding to horizontal position.

The previous paragraphs demonstrated how linkage matrices could be determined for finding circle positions along either a horizontal or a vertical line. However, usually it would be desirable to find the position of an object in a xy-plane. In a first approximation this can be accomplished by treating the horizontal and vertical directions as independent of each other, and by assuming that the linkage matrix for one coordinate direction is independent of the other coordinate. Thus, the linkage matrix $C^u$ obtained from FIG. 10 is assumed to be determined from training on horizontal lines at many y-positions over the entire image and consequently valid for each horizontal line, while the linkage matrix $C^v$ obtained from FIG. 11 is assumed to be similarly determined from training on vertical lines at many x-positions over the entire image and consequently valid for each vertical line. In practice, training data for estimation of both matrices will be obtained during the same session, where x and y are in some regular or arbitrary pattern made to assume values within the area of definition. With these assumptions the position of a circle in the xy-plane may be expressed (in channel representation) as:

$$\begin{cases} u = C^u a \\ v = C^v a \end{cases}$$

This algorithm works remarkably well in spite of its simplicity. The reason for this is that different sets of features generally are active in different regions or intervals of u and v.

A more accurate algorithm is given by the following coupled equations:

$$\begin{cases} u = C^u v \otimes a = C^u a^u \\ v = C^v u \otimes a = C^v a^v \end{cases}$$

where $\otimes$ denotes the Kronecker product. For example:

$$a^u = v \otimes a = \begin{pmatrix} v_1 a \\ v_2 a \\ \vdots \\ v_L a \end{pmatrix} = \begin{pmatrix} v_1 a_1 \\ v_1 a_2 \\ \vdots \\ v_1 a_H \\ v_2 a_1 \\ v_2 a_2 \\ \vdots \\ v_2 a_H \\ \vdots \\ v_L a_1 \\ v_L a_2 \\ \vdots \\ v_L a_H \end{pmatrix}$$

where L is the dimensionality of v. It is noted that in these coupled equations the coupled feature vectors $a^u$ and $a^v$ are of higher dimensionality than the uncoupled feature vector a. This also leads to correspondingly larger linkage matrices $C^u$ and $C^v$. These coupled equations may be solved by conventional iterative methods. For example, they may be expressed as:

$$\begin{cases} u(i) = C^u v(i-1) \otimes a \\ v(i) = C^v u(i-1) \otimes a \end{cases}$$

where index i is an iteration index. This iterated sequence typically converges in a few iteration steps.

The training procedure is similar to the uncoupled case, except that coupled feature matrices $A^u$ and $A^v$ defined by:

$$A^u = \begin{pmatrix} v_1^1 a^1 & v_1^2 a^2 & \cdots & v_1^N a^N \\ v_2^1 a^1 & v_2^2 a^2 & \cdots & v_2^N a^N \\ \vdots & \vdots & \vdots & \vdots \\ v_L^1 a^1 & v_L^2 a^2 & \cdots & v_L^N a^N \end{pmatrix} \quad A^v = \begin{pmatrix} u_1^1 a^1 & u_1^2 a^2 & \cdots & u_1^N a^N \\ u_2^1 a^1 & u_2^2 a^2 & \cdots & u_2^N a^N \\ \vdots & \vdots & \vdots & \vdots \\ u_K^1 a^1 & u_K^2 a^2 & \cdots & u_K^N a^N \end{pmatrix}$$

are used instead of the uncoupled feature matrix A. Here the superscripts refer to the respective training samples. It is noted that u and v may have different dimensionalities K and L, respectively.

From the description above it is clear that the coupled model is more complex than the uncoupled model. However, it is also more accurate, since the added complexity gives a richer model with larger linkage matrices.

For a circle another feature, namely the size of the circle may be of interest. This feature may be extracted from the same feature vector a as the location by using another linkage matrix $C^w$. Thus, if the size (the radius or diameter) of the circle is represented by the response vector w, one obtains:

$$w = C^w a$$

Figure 12:
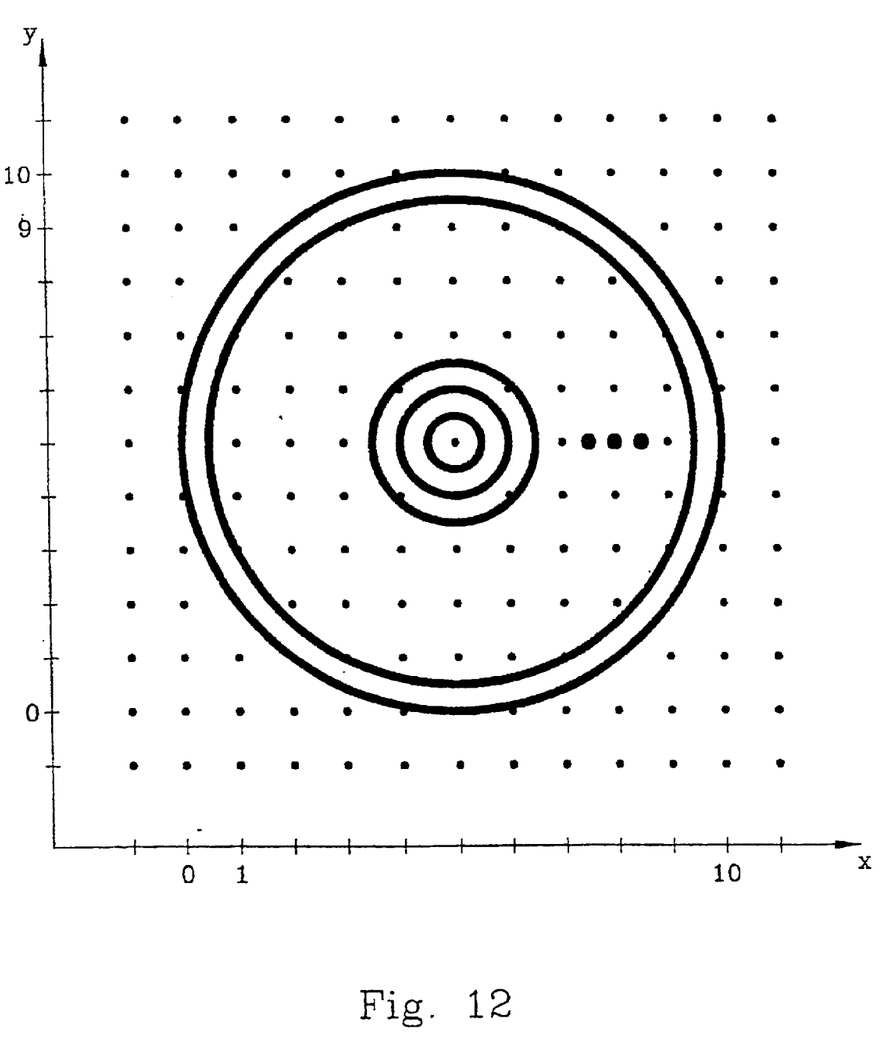
FIG. 12 is a diagram of a set of different size circles used for training.

FIG. 12 is a diagram of a set of different size circles that may be used for training purposes if the simple uncoupled model is used. This model will give satisfactory results as long as the center of the circle to be detected is near the training position. Combined with the previously described uncoupled model for the circle position, it is now possible to completely describe a circle having arbitrary position and size by the set of equations:

$$\begin{cases} u = C^u a \\ v = C^v a \\ w = C^w a \end{cases}$$

This requires that the C matrices are trained over the entire combined definition range of the scalars u, v and w that correspond to response vectors u, v and w.

A more accurate model is a coupled model that considers variations in both circle position and size. This model is described by the equations:

$$\begin{cases} u = C^u \begin{pmatrix} v \\ w \end{pmatrix} \otimes a = C^u a^u \\ v = C^v \begin{pmatrix} u \\ w \end{pmatrix} \otimes a = C^v a^v \\ w = C^w \begin{pmatrix} u \\ v \end{pmatrix} \otimes a = C^w a^w \end{cases}$$

In these equations the vectors within parenthesis are obtained by concatenating the indicated vectors. Thus, a coupled feature vector such as $a^u$ may explicitly be written:

$$a^u = \begin{pmatrix} v_1 a \\ v_2 a \\ \vdots \\ v_L a \\ w_1 a \\ w_2 a \\ \vdots \\ w_M a \end{pmatrix}$$

where L and M denote the dimensionality of v and w, respectively. This also implies that the C matrices are larger than in the uncoupled case. As previously these coupled equations may be solved by iterative methods.

The coupled feature matrices used for training are obtained in a similar way. For example, the coupled feature matrix $A^u$ may be expressed as:

$$A^u = \begin{pmatrix} v_1^1 a^1 & v_1^2 a^2 & \ldots & v_1^N a^N \\ v_2^1 a^1 & v_2^2 a^2 & \ldots & v_2^N a^N \\ \vdots & \vdots & \vdots & \vdots \\ v_L^1 a^1 & v_L^2 a^1 & \ldots & v_L^N a^N \\ w_1^1 a^1 & w_1^2 a^2 & \ldots & w_1^N a^N \\ w_2^1 a^1 & w_2^2 a^2 & \ldots & w_2^N a^N \\ \vdots & \vdots & \vdots & \vdots \\ w_M^1 a^1 & w_M^2 a^2 & \ldots & w_M^N a^N \end{pmatrix}$$

The coupled model may be general to any number of response vectors required to describe an object. The general rule for forming coupled feature vectors is to concatenate all response vectors except the one for which a coupled feature vector is sought. The sought feature vector is then formed by the outer or Kronecker product between the concatenated vector and the uncoupled feature vector.

A variation of this coupled model (in the multi-dimensional case) is to refrain from concatenation of vectors and instead apply the Kronecker product operator several times. Thus, in the three-dimensional case one obtains:

$$\begin{cases} u = C^u w \otimes v \otimes a = C^u a^u \\ v = C^v u \otimes w \otimes a = C^v a^v \\ w = C^w v \otimes u \otimes a = C^w a^w \end{cases}$$

A coupled feature vector such as $a^u$ may explicit be written as:

$$a^u = \begin{pmatrix} w_1 v_1 a \\ w_1 v_2 a \\ \vdots \\ w_1 v_L a \\ w_2 v_1 a \\ w_2 v_2 a \\ \vdots \\ w_2 v_L a \\ \vdots \\ w_M v_1 a \\ w_M v_2 a \\ \vdots \\ w_M v_L a \end{pmatrix}$$

The coupled model described above couples vectors on the input side. However, it is also possible to employ a coupled model that uses coupled response vectors instead. For two response vectors u and v this model may be expressed by the equation:

$$u \otimes v = C^{uv} a$$

where $u \otimes v$ denotes the Kronecker product of u and v:

$$u \otimes v = \begin{pmatrix} u_1 v \\ u_2 v \\ \vdots \\ u_K v \end{pmatrix} = \begin{pmatrix} u_1 v_1 \\ u_1 v_2 \\ \vdots \\ u_1 v_L \\ u_2 v_1 \\ u_2 v_2 \\ \vdots \\ u_2 v_L \\ \vdots \\ u_K v_1 \\ u_K v_2 \\ \vdots \\ u_K v_L \end{pmatrix}$$

and a is the corresponding feature vector. The linkage matrix $C^{uv}$ is estimated by a training procedure as in the previously described models. This training procedure results in the set of equations:

$$((u \otimes v)^1 \ (u \otimes v)^2 \ \ldots \ (u \otimes v)^N) = C^{uv} A$$

where N denotes the number of samples in the training set. This response vector coupled model gives more localized responses, as compared to the other models, which is an advantage if the feature vectors for a particular problem are not well localized.

Once the linkage matrix $C^{uv}$ has been determined from the training procedure, it is possible to uncouple the coupled response vector $u \otimes v$ to obtain estimates of the individual vectors u and v. Such estimates may be obtained from the following set of equations:

$$\begin{cases} \hat{u}_k = d \sum_{l=1}^{L} u_k v_l & k = 1, \ldots, K \\ \hat{v}_l = d \sum_{k=1}^{K} u_k v_l & l = 1, \ldots, L \end{cases}$$

where d is a scale factor due to the summation of components scaled by the sum of the other response vector. In the case discussed above, with raised cosine transfer functions and a channel separation of $\pi/3$, the sum of a fully activated channel vector is always 1.5, and the scale factor then becomes d=1/1.5. Furthermore, in these equations only the products $u_k v_l$ and not the individual factors $u_k$ and $v_l$ are assumed to be known.

In three dimensions this model may be generalized to:

$$\begin{cases} u \otimes v = C^{uv} a \\ u \otimes w = C^{uw} a \\ v \otimes w = C^{vw} a \end{cases}$$

After training and determination of the linkage matrices, estimates of the uncoupled response vectors u, v and w may be obtained from the coupled response vectors. However, since each coupled response vector determines two uncoupled response vector estimates, there will now be two estimates for each uncoupled response vector u, v and w. These two estates may be compared to each other, in order to provide a more redundant and reliable estimate of the response vector.

Another embodiment of this model reduces this redundancy by coupling only exclusive pairs of response vectors. In such a model response vectors u, v, w and t are coupled in accordance with:

$$\begin{cases} u \otimes v = C^{uv} a \\ w \otimes t = C^{wt} a \end{cases}$$

The solution of these equations gives single estimates of each response vector. Such a single non-redundant estimate is deemed sufficient for most cases. In the case of further response vectors, additional coupled pairs may be introduced as required.

The above described model with coupled output vectors may also be represented in outer product notation instead of Kronecker product notation. In this notation the model becomes:

$$uv^T = \begin{pmatrix} u_1 v_1 & u_1 v_2 & \cdots & u_1 v_L \\ u_2 v_1 & u_2 v_2 & \cdots & u_2 v_L \\ \vdots & \vdots & \vdots & \vdots \\ u_K v_1 & u_K v_2 & \cdots & u_K v_L \end{pmatrix} = D^{uv} a$$

where $D^{uv}$ denotes a three-dimensional matrix having the same elements as $C^{uv}$, but arranged in a three-dimensional array instead of a two-dimensional array. It is also noted that $uv^T$ contains exactly the same elements as $u \otimes v$, but that the elements are arranged as a two-dimensional array (matrix) instead of a one dimensional array (vector). Thus, the two notations are mathematically equivalent. The matrix $D^{uv}$ is obtained by a training procedure that results in the set of equations:

$$UV = ((uv^T)^1 (uv^T)^2 \ldots (uv^T)^N) = D^{uv}(a^1 a^2 \ldots a^N) = D^{uv} A$$

Here UV represents a three-dimensional matrix rather than the product of two matrices U and V.

Still another coupled model may be obtained by coupling response vectors to linkage matrices. This model may be seen as a variation of the just discussed model. This variation consists of projecting the matrix uv on the vector v, such that:

$$uv^T v = u|v|^2$$

which gives u except for a scale factor $|v|^2$, which may be normalized.

If the same projection is performed on the right hand side ($D^{uv}a$), one may define (in component notation) the projected matrix $C^u$:

$$c_{kh}^u = s_{kh}^u \sum_{l=1}^{L} v_l d_{klh}^{uv}$$

where $S_{kh}^u$ are scale factors. After performing such projections this model may be expressed as (in two dimensions):

$$\begin{cases} u = C^u a \\ v = C^v a \end{cases}$$

Since the three-dimensional linkage matrix $D^{uv}$ (on which $C^u$ and $C^v$ are based) is the same as in the previously discussed model, the same training procedure may be used.

Generalization to more than 2 response vectors is similar to previously discussed models. For example, with three response vectors one obtains:

$$\begin{cases} u = C^u a \\ v = C^v a \\ w = C^w a \end{cases}$$

Here the coupled linkage matrices are defined by:

$$\begin{cases} c_{kh}^u = s_{kh}^u \sum_{i=1}^{L+M} \alpha_i d_{kih}^{u(vw)} \\ c_{lh}^v = s_{lh}^v \sum_{i=1}^{M+K} \beta_i d_{lih}^{v(wu)} \\ c_{mh}^w = s_{mh}^w \sum_{i=1}^{K+L} \gamma_i d_{mih}^{w(uv)} \end{cases} \begin{cases} h = 1 \ldots H \\ h = 1 \ldots K \\ l = 1 \ldots L \\ m = 1 \ldots M \end{cases}$$

where the coupling vectors $\alpha$, $\beta$, $\gamma$ are defined as:

$$\alpha = \begin{pmatrix} v \\ w \end{pmatrix} \beta = \begin{pmatrix} w \\ u \end{pmatrix} \gamma = \begin{pmatrix} u \\ v \end{pmatrix}$$

and $$\{d_{kih}^{u(vw)}\} = D^{u(vw)} \quad \{d_{lih}^{v(wu)}\} = D^{v(wu)} \quad \{d_{mih}^{w(uv)}\} = D^{w(uv)}$$

define the three (three-dimensional) linkage matrices.

A linkage matrix typically has the following properties:
1. The elements of the linkage matrix are preferably non-negative, as this gives a more sparse matrix and a more stable system. Negative values are, however, allowed in principle.
2. The elements of the linkage matrix are preferably limited in magnitude, as this as well gives a more stable system.
3. The linkage matrix is sparse (has few non-zero elements). This implies that the system may be handled by procedures that are optimized for solving sparse systems of equations (see [2]) for values between two limits (see [3]), for example 0 and 1.
4. An even sparser linkage matrix providing more efficient computation, essentially without affecting performance, may be obtained by discarding matrix elements below a predefined threshold (for example 0.01 if the elements are allowed to vary between 0 and 1). The same method may also be applied to feature matrix A.

Figure 13:
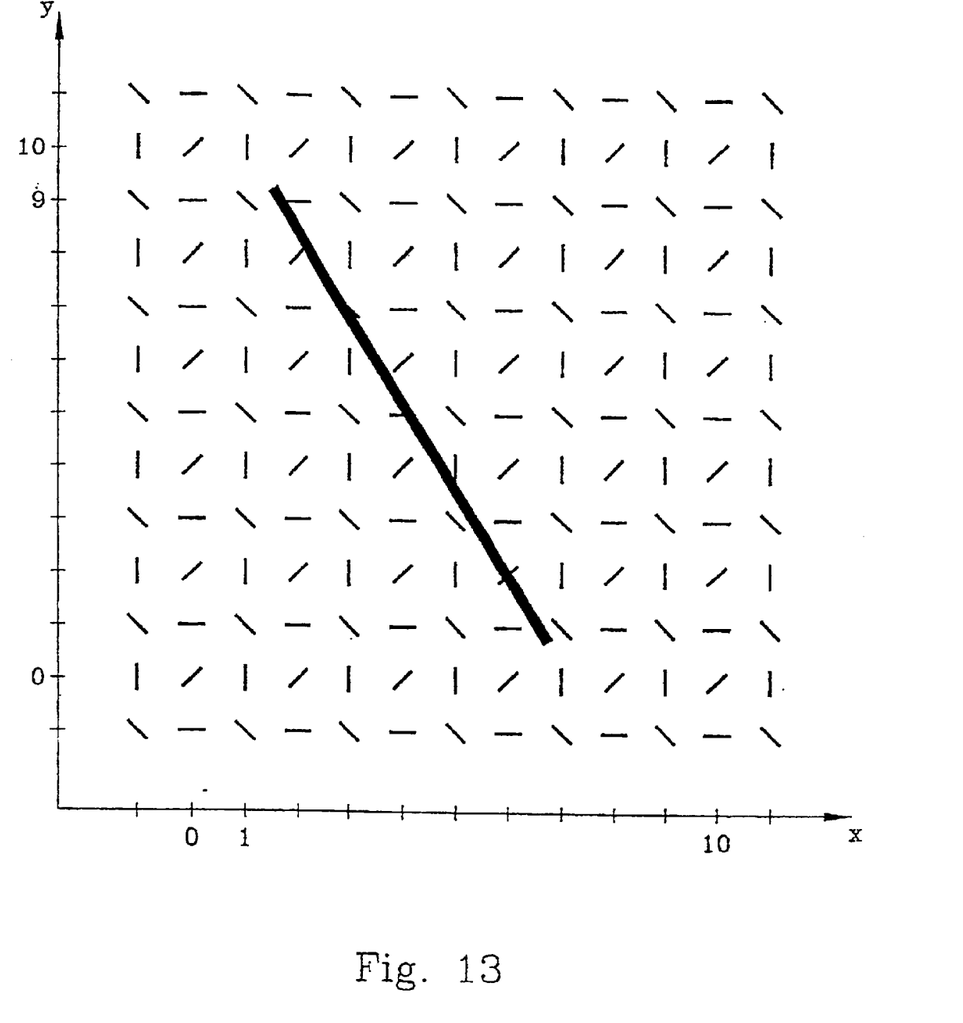
FIG. 13 is a diagram illustrating a detector arrangement for detecting line segments.

In the description above the present invention has been described with reference to a specific type of object, namely a circle. However the same principles may be applied to other types of objects as well. For example, FIG. 13 is a diagram illustrating a detector arrangement for detecting line segments ([4] describes line detection in general). An essential aspect of a line segment is its orientation. The detectors in FIG. 13 will detect both position and orientation.

Such a detector may have a composite transfer function described by:

$$p_{klm}(x, y, \phi) = \cos^2\left(\frac{\pi}{3}\sqrt{(x-k)^2 + (y-l)^2}\right)\cos^2\left(\phi + m\frac{\pi}{4}\right),$$

$$\begin{cases} k - \frac{3}{2} \leq x \leq k + \frac{3}{2} \\ l - \frac{3}{2} \leq y \leq l + \frac{3}{2} \\ m = 0, 1, 2, 3, \\ \left|\phi + m\frac{\pi}{4}\right| \leq \frac{\pi}{2}. \end{cases}$$

Thus, there are four detector types (corresponding to m=0, 1, 2, 3), each detector type having a specific preferred orientation. In order to detect an arbiter orientation of a line segment, these four detector types have to be distributed over the detection region, for example as in FIG. 13. The distribution may be systematic, as in FIG. 13, or random. Typical these detectors are less densely arranged than the previously discussed position detectors, due to the fact that the expected object, a line, will activate several detectors. As previously the outputs from the detectors are arranged in a percept vector, from which a feature vector is formed. A trained linkage matrix is used to obtain a response vector representing the line orientation in channel representation form. If desired this response vector may be converted into a scalar orientation value.

Other characteristics for a line segment are its position and length. These properties may be detected from the same feature vector as the orientation by using different trained linkage matrices. As previously it is possible to use both a coupled and an uncoupled model. Training of the linkage matrices is performed by using different line segments having different known positions, lengths and orientations.

Other objects, such as triangles, squares, arcs, ellipses etc may be detected in similar ways.

Another essential feature of the method in accordance with the present invention is that a response vector may be used as a percept vector for detection of higher level characteristics. Thus, it is possible to detect a composite object by combining response vectors from its parts into a new percept vector, form a new feature vector representing the composite object and form new response vectors representing the composite object with new trained linkage matrices.

Figure 14:
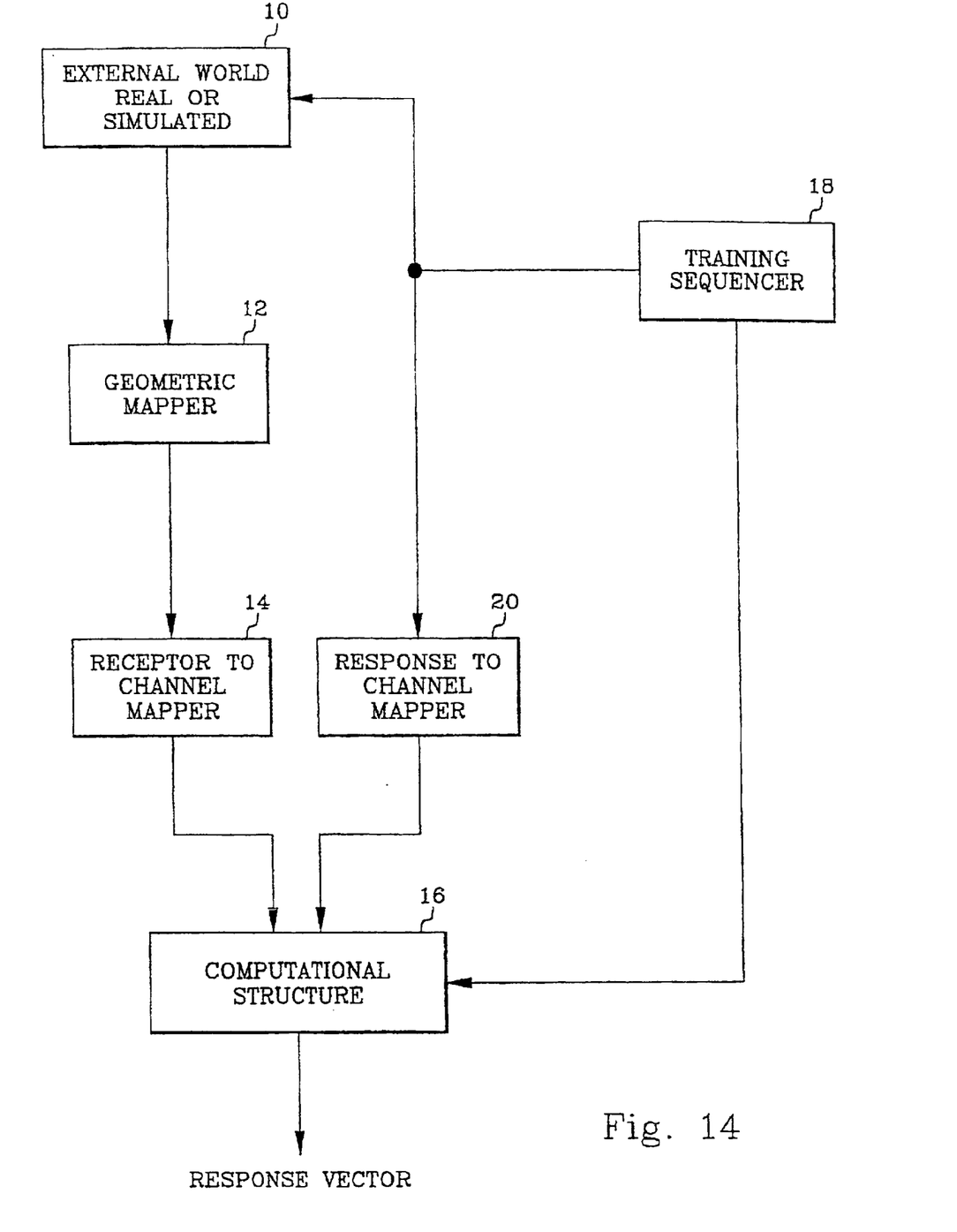
FIG. 14 is an embodiment of an artificial vision system in accordance with the present invention.

FIG. 14 is an embodiment of an artificial vision system in accordance with the present invention. An external world scene 10, real or simulated, is recorded by a geometric mapper 12, such as a camera, a video camera or any other means that produces one or several images to be analyzed. A receptor to channel mapper 14 including an array of detectors produces a percept vector for each image. A computational structure 16, typically including a microprocessor or a micro/signal processor combination, transforms each percept vector into a corresponding feature vector and generates response vectors describing an object by using corresponding trained linkage matrices. Computational structure 16 is also connected to a training sequencer 18, During a training phase this training sequencer generates changes, either systematic or pseudo random, in the external world. For example, the position and/or size of an object that the system is intended to track is changed (the size of the object in a two-dimensional image may, for example, represent the distance to the object). Training sequencer 18 provides each position with coordinate values and each size with a size value. These coordinate and size values are transformed to channel representation in a response to channel mapper 20. Similarly, the obtained sequence of response vectors is recorded in computational structure 16 and associated with corresponding detected feature vectors. When the training sequence is complete, a control signal from training sequencer 18 informs computational structure 16 that the training sequence has been completed. Computational structure 16 then finds the linkage matrices to be used in the future for detecting the same type of object.

Figure 15:
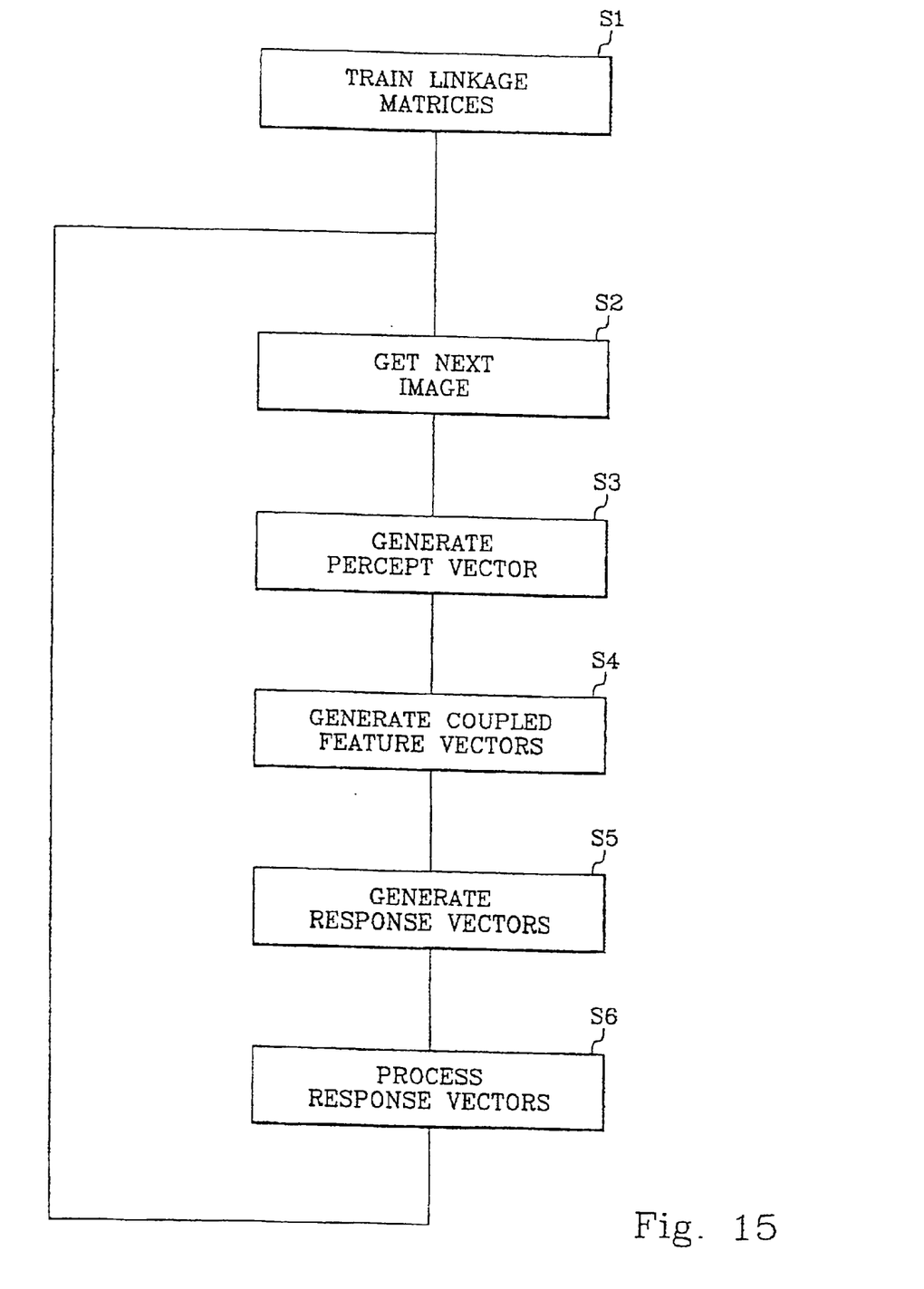
FIG. 15 is a flow chart illustrating an embodiment of the method in accordance with the present invention.

FIG. 15 is a flow chart illustrating an embodiment of the method in accordance with the present invention. After training the linkage matrices in step S1, step S2 gets an image to analyze. Step S3 generates the percept vector from the image. Step S4 transforms this percept vector into a set of coupled feature vectors. Step S5 generates a corresponding set of response vectors. Step S6 uses these response vectors for further processing. This further processing may include forming new feature vectors for higher level processing or converting response vectors to scalars for controlling the real word system represented by the image. Finally the method gets the net image and repeats the process.

It will be understood by those skilled in the art that various modifications and changes may be made to the present invention without departure from the scope thereof, which is defined by the appended claims.

REFERENCES

[1] Using MATLAB, MathWorks Inc, 1996, pp. 4-2–4-3, 4-13–4-14
[2] Using MATLAB, MathWorks Inc, 1996, pp. 9-2–9-4, 4-33–4-36
[3] MATLAB Reference Guide, MathWorks Inc, 1992, pp. 341–342
[4] B. Jähne, "Practical Handbook on Image Processing for Scientific Applications", CRC Press, 1997, pp. 416–440.

What is claimed is:

1. An artificial vision method, characterized by:
generating an image percept vector;
transforming said image percept vector into a feature vector; and
generating a response array by multiplying said feature vector by a trained linkage matrix modeling a precept-response system.

2. The method of claim 1, characterized by said feature vector including the covariance products of said image precept vector.

3. The method of claim 2, characterized by said feature vector including the auto-covariance products of said image precept vector.

4. The method of claim 3, characterized by said feature vector including the components of said image precept vector.

5. The method of claim 1, characterized in that the elements of said linkage matrix are non-negative.

6. The method of claim 5, characterized in that the elements of said linkage matrix are restricted to values between zero and a predetermined positive value.

7. The method of claim 1, characterized by forming a coupled feature vector by coupling said feature vector to a response array, represented by a vector, using a Kronecker product before performing said matrix multiplication.

8. The method of claim 1, characterized by forming a coupled feature vector by coupling said feature vector to several response arrays, represented by vectors, using repeated Kronecker products before performing said matrix multiplication.

9. The method of claim 1, characterized by said response array being a coupled response vector formed by two response vectors coupled to each other by, a Kronecker product.

10. The method of claim 1, characterized by said response array being a coupled response vector formed by two response vectors coupled to each other by, an outer product.

11. The method of claim 1, characterized by said linkage matrix being a coupled linkage matrix formed by weighing a set of uncoupled linkage matrices with the elements of another response vector.

12. The method of claim 1, characterized by converting, each response vector into a corresponding scalar response signal.

13. The method of claim 1, characterized by discarding linkage matrix elements below a performed threshold.

14. The method of claim 1, characterized by said precept vector being sparse, each non-zero precept vector element giving a continuos representation limited in definition range with respect to some variable property of an object in an image.

15. The method of claim 1, characterized by said precept vector being sparse, each non-zero precept vector element giving a continuos representation, limited in spatial range, of the position an object in an image.

16. An artificial vision system characterized by:
means (12, 14) for generating an image percept vector;
means (16) for transforming said image percept vector into a feature vector; and
means (16) for generating, a response array by multiplying said feature vector by a trained linkage matrix modeling a percept-response system.

17. The system of claim 16, characterized by means (18, 20) for training said linkage matrix.

18. A precept-response system for sensing and control, characterized by:
means (12, 14) for generating a precept vector;
means (16) for transforming said precept vector into a feature vector; and
means (16) for generating a response array by multiplying said feature vector by a trained linkage matrix modeling said precept-response system.

19. The system of claim 18, characterized by means 18, 20 for training said linkage matrix.

* * * * *